United States Patent
Fensterle et al.

(10) Patent No.: US 10,145,943 B2
(45) Date of Patent: Dec. 4, 2018

(54) METHOD FOR OPERATING AN OPTICAL PROXIMITY SWITCH IN ACCORDANCE WITH THE TIME-OF-FLIGHT PRINCIPLE

(71) Applicant: IFM ELECTRONIC GMBH, Essen (DE)

(72) Inventors: Rolf Fensterle, Ravensburg (DE); Hartmut Bielefeldt, Friedrichshafen (DE); Eduard Gjabri, Friedrichshafen (DE)

(73) Assignee: IFM ELECTRONIC GMBH, Essen (DE)

( * ) Notice: Subject to any disclaimer, the term of this patent is extended or adjusted under 35 U.S.C. 154(b) by 203 days.

(21) Appl. No.: 15/121,545

(22) PCT Filed: Feb. 10, 2015

(86) PCT No.: PCT/EP2015/052748
§ 371 (c)(1),
(2) Date: Aug. 25, 2016

(87) PCT Pub. No.: WO2015/128186
PCT Pub. Date: Sep. 3, 2015

(65) Prior Publication Data
US 2016/0363655 A1    Dec. 15, 2016

(30) Foreign Application Priority Data

Feb. 25, 2014   (DE) .................. 10 2014 203 381

(51) Int. Cl.
*G01C 3/08* (2006.01)
*G01S 7/497* (2006.01)
(Continued)

(52) U.S. Cl.
CPC ............ *G01S 7/497* (2013.01); *G01S 17/026* (2013.01); *G01S 17/08* (2013.01)

(58) Field of Classification Search
CPC ......... G01S 7/497; G01S 17/026; G01S 17/08
See application file for complete search history.

(56) References Cited

FOREIGN PATENT DOCUMENTS

| | | |
|---|---|---|
| CN | 201584955 U | 9/2010 |
| CN | 202121564 U | 1/2012 |

(Continued)

OTHER PUBLICATIONS

"Bedienungsanieitung PMD 3D Sensor", May 1, 2010 (May 1, 2010), XP055183422, retrieved from the Internet https://www.ifm.com/mounting/704538UK.pdf. English equivalent. (Year: 2010).*

(Continued)

*Primary Examiner* — Samantha K Abraham
(74) *Attorney, Agent, or Firm* — Bond Schoeneck & King, PLLC; George McGuire

(57) ABSTRACT

The invention relates to a method for operating an optical proximity switch, wherein an object distance E is determined by means of a time-of-flight method and a specified range is limited by an adjustable switching distance SAE. The switching output (6) is activated at an object distance E1<SAE and deactivated at an object distance E2>SAE+H (SAE), wherein a hysteresis H (SAE,R) depending on the switching distance SAE and on a reflectivity R is stored in the proximity switch, and, after the switching output (6) has been activated, the reflectivity R of the object is determined in addition to the object distance E2 and the switching output (6) is deactivated again only when the condition E2>SAE+H(SAE,R) is satisfied. The invention further relates to an optical proximity switch for performing the method according to the invention.

6 Claims, 2 Drawing Sheets

(51) Int. Cl.
*G01S 17/02* (2006.01)
*G01S 17/08* (2006.01)

(56) References Cited

FOREIGN PATENT DOCUMENTS

| CN | 102680015 A | 9/2012 |
| CN | 103427817 A | 12/2013 |
| DE | 10138609 | 2/2003 |
| EP | 1271183 | 1/2003 |

OTHER PUBLICATIONS

"Bedienungsanleitung PMD 3D Sensor", May 1, 2010 (May 1, 2010), XP055183422, retrieved from the Internet: URL://www.ifm.com/mounting/704668DE.pdf [retrieved on Apr. 16, 2015].
International Search Report and Written Opinion, International Application No. PCT/EP2015/052748, pp. 1-8, International Filing Date Feb. 10, 2015.

* cited by examiner

METHOD FOR OPERATING AN OPTICAL PROXIMITY SWITCH IN ACCORDANCE WITH THE TIME-OF-FLIGHT PRINCIPLE

CROSS REFERENCE TO RELATED APPLICATION

The Present application is the United States National Stage Application under 35 U.S.C. 371 based off of International Application Serial Number PCT/EP2015/052748, filed Feb. 10, 2015, which claims priority to German Application Serial Number 102014203381.0, filed Feb. 25, 2014, the entirety of which is hereby incorporate by reference.

BACKGROUND OF THE INVENTION

1. Field of the Invention

The invention relates to a method for operating an optical proximity switch in accordance with the time-of-flight principle according to the preamble of claim 1. Furthermore, an optical proximity switch operated according to the invention is claimed.

2. Description of the Related Art

Optical proximity switches are widely used in the automation technology. In addition to energetic switches there are optical proximity switches operating both according to the triangulation principle and the time-of-flight principle. Devices of this type are also manufactured and sold by the applicant.

A known method of measuring the time-of-flight is the phase comparison between a preferably modulated transmission signal and the reception signal reflected by an object. A component suitable for this measurement and operating according to the phase delay principle is known from the DE 198 21 974 B4. The photonic mixer devices (PMD) described there include two photosensitive modulation photogates and two non-photosensitive accumulation gates. The modulation photogates are connected to a modulating means and the accumulation gates are connected to a read-out means. These mixing elements are also known as PMD pixel or PMD receiver. Because they have been constructed to produce three-dimensional camera images, in addition to phase differences originating from the time-of-flight they also detect the amplitude of the transmission signal reflected from an object.

Distance sensors equipped with such a PMD single receiver are offered by the applicant under the name O1D, OID or O5D. They can generate an analog distance signal or a binary switching signal (object detection signal), and, thus, can be operated as optical proximity switches, too.

From EP 1 312 936 A2 a device working according to the phase comparison principle for monitoring a protection zone is known which generates a binary object detection signal. In order to avoid an unnecessary change of the switching states at slight variations of the demodulation signal at least a second threshold value for generating a switching hysteresis is generated. In this way in place of the "exact" distance a distance interval depending on the hysteresis is obtained. Since in the choice of the hysteresis the variation of the measured value occurring in black objects has to be taken into account, in many applications the hysteresis is greater than necessary.

In order to avoid the hysteresis region limiting the resolution of the sensor DE 10 2008 020 416 B3 teaches to generate frequency distributions by means of a learning process in order to determine a weighting function which divides the range of values into a first and a second switching state. A disadvantage is the complex learning process.

SUMMARY OF THE INVENTION

It is the object of the invention to overcome the disadvantages of the prior art at least partially and to provide a method for setting the hysteresis for optical proximity switches operating according to the phase comparison principle and a suitable arrangement.

This object is achieve according to the features of claim 1. The further claims relate to the advantageous embodiment of the method and an arrangement appropriate for achieving the object.

The essential idea of the invention is to use the amplitude of the reception signal or the signal-to-noise ratio as a criterion for the setting of the hysteresis. Thus, the abovementioned distance interval remains small for well reflective measurement objects with strong reception signals or good signal-to-noise ratios, without prohibiting the operation with less well reflecting objects. Furthermore, there is the possibility to discriminate safe from unsafe conditions and to signal this on the basis of the hysteresis.

To this end, the object distance is determined from the time-of-flight and the amplitude of the reflected light signal is measured. Using these two measured values a reflectivity R of the measurement object is determined and finally a value for the hysteresis is set depending on the object distance and the reflectivity of the object, wherein this value increases with decreasing amplitude, i.e. with increasing distance or deterioration of the reflectivity.

In this case, the hysteresis may be taken from a table stored in the control unit of the proximity switch, calculated by a microprocessor according to an algorithm likewise stored in the control unit, entered over a communication interface (data interface), for example, an IO-Link or entered manually via a keyboard or a potentiometer.

A learning process, in which the object is shown at different distances and its reflectivity is measured on the basis of the amplitude is also possible. Moreover, a mean value of several measurements or their standard deviation may be used as a criterion for the setting of the hysteresis.

For strong signals or small standard deviations the hysteresis and thus the hysteresis interval can remain small. With weak and noisy signals a greater hysteresis is chosen so that the abovementioned unwanted signal changes at the switching output do not occur.

The method according to the invention can be realized with the PMD receiver mentioned above, wherein an object distance E in a predetermined (monitoring) range is determined by means of a time-of-flight method and additionally an amplitude signal is output.

The predetermined range is limited in a known way by an adjustable switching distance SAE, wherein the binary switching output is activated when an object distance E1<SAE is detected. It is deactivated when an object distance E2>SAE+H(SAE) is detected. According to the invention a hysteresis H (SAE,R) de-pending on the switching distance SAE and a reflectivity R is stored in the optical proximity switch, wherein after the activation of the switching output in addition to the object distance E2 also the reflectivity R of the object is determined and the switching output is only deactivated, when the condition E2<H(SAE, R) is satisfied.

In a preferred embodiment the reflectivity R is stored as a reflectivity R1 at the time of activation of the switching output and after activation of the switching output the current reflectivity R2 is measured, wherein a hysteresis H (SAE,R1,R2) is determined in dependence on the reflectivity R2 measured after the activation of the switching output.

The teachings of the invention can of course also be applied in the case of dark switching (contrast inversion). In this case the switch-on and switch-off processes have to be interchanged.

BRIEF DESCRIPTION OF THE DRAWINGS

The invention will be explained in more detail with reference to the drawing.

DETAILED DESCRIPTION

Figure 1:
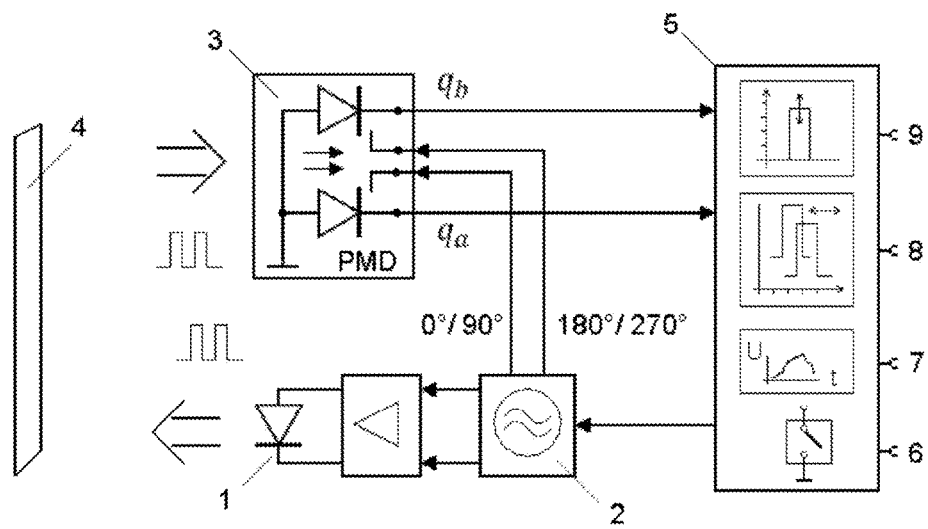
FIG. 1 shows an optical proximity switch with an PMD receiver in a schematic diagram.

FIG. 1 shows the essential assemblies of an optical proximity switch according to the invention operating according to the phase delay time principle with a PMD receiver 3 in a coarse simplified schematic representation.

The transmitter 1 can emit a sinusoidal or, as shown herein, a rectangular modulated light signal. The light signal is reflected by the measuring object 4, and arrives with a phase shift corresponding to the time-of-flight at the PMD receiver 3 which is modulated in known manner with different phases of the transmission signal, such as 0° and 180° or 90° and 270°. The charges qa and qb thus generated are supplied to an evaluation unit 5 which is adapted to produce a phase signal 8 (phase delay time) representing the object distance E and an amplitude signal 9 representing among others the reflectivity R.

The output is usually an analog signal or a binary switching signal the hysteresis H of which previously was only dependent on the measured object distance E in a known manner. According to the invention, as shown in the following FIG. 2, the reflectivity R of the object 4, and, thus, also the signal amplitude and the noise behavior are taken into account.

In order to prevent random switching of the proximity switch at a fixed object distance, two switching thresholds are stored in the proximity switch. One switching threshold for switching on and one switching threshold for switching off. These two thresholds define the switching hysteresis. Both switching thresholds are associated with a corresponding distance from the sensor, namely a switch-on and a switch-off distance. Once the measured distance value of a detected object is below or above the switch-on distance or the switch-off distance the sensor switches on or off.

The hysteresis range between the switch-on and the switch-off distance has to be selected at least so wide that an object which is located in the center of this range, does not result in a statistical change of the switching state due to fluctuations in the measured value, i.e. the hysteresis range must necessarily be greater than the measurement uncertainty. The measurement uncertainty in optical proximity sensors essentially depends on two factors, on the one hand on the distance from the proximity switch and on the other hand on the reflectivity of the object.

Figure 2:
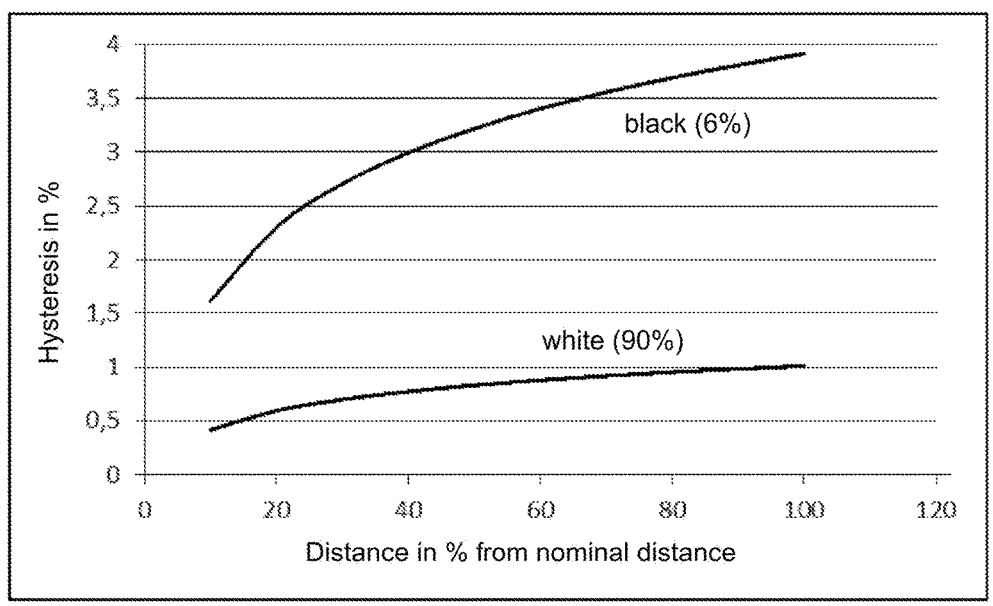
FIG. 2 shows the typical behavior of the hysteresis for well and weak reflective objects.

FIG. 2 shows an empirically determined typical behavior of the hysteresis for well and weak reflective objects as a function of the distance. The upper curve relates to an object with 6% reflectivity with a low reception amplitude. The lower curve relates to an object with 90% reflectivity with a correspondingly high reception amplitude and a good signal-to-noise ratio S/N. The reflectivity R of an object for a known object distance can be derived from the amplitude, e.g. from the sum signal qa+qb produced at the PMD receiver, since the amplitude is proportional to the reflectivity.

If the amplitude as a function of the object distance is known for a reference object the reflectivity of any unknown object can be estimated at any distance. If, for example, the amplitude of a black object (6%) is determined over the entire measurement distance at the factory calibration, the proximity switch from now on can assign to each amplitude a brightness factor relative to the reference object (6%).

Brightness factor=amplitude object/amplitude reference object

If the dispersion of the measured values is dominated by external light mainly caused by shot noise, one can assume that the dispersion of the measured values is reduced by a factor 1/root of the brightness factor. Consequently, the hysteresis H can be reduced to the same scale.

Figure 3:
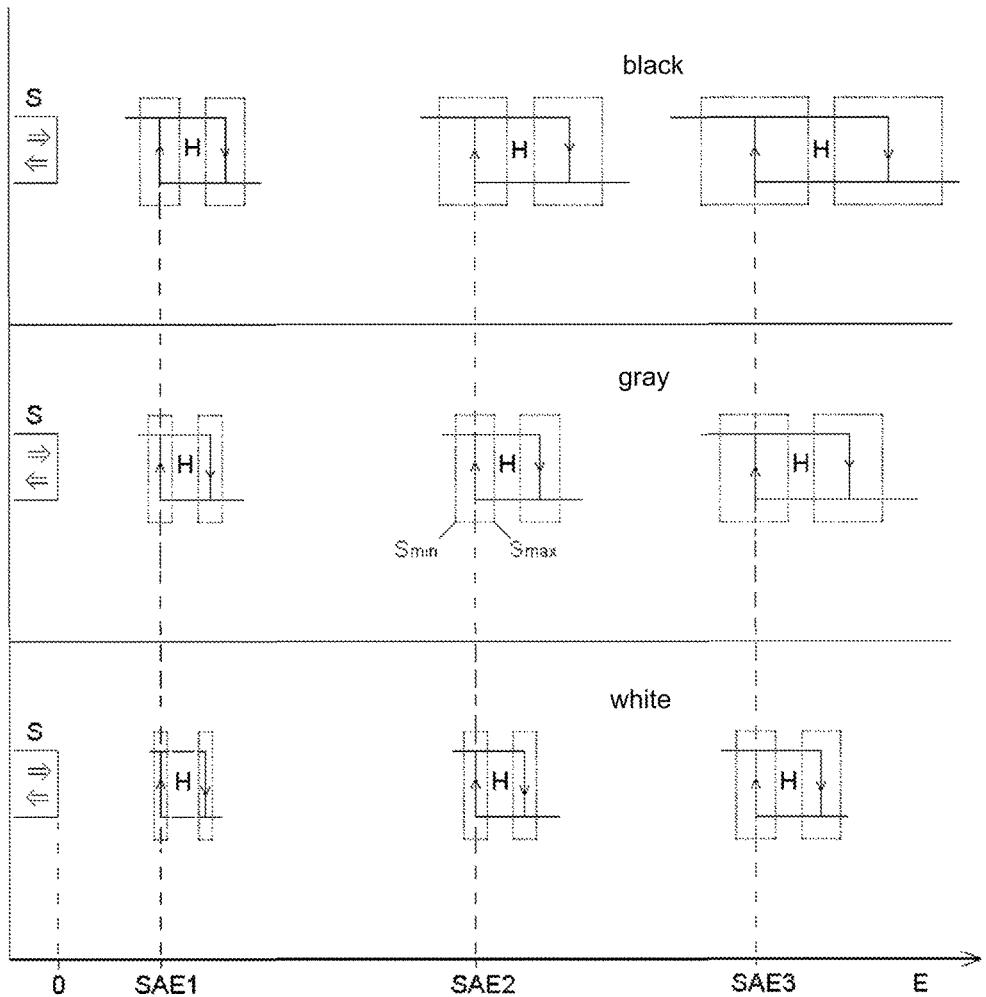
FIG. 3 shows a further representation of the hysteresis for various objects and distances.

FIG. 3 shows the signal change for objects with different reflectivities at different switching distances SAE, where the arrows indicate the switch-on and switch-off points.

The hysteresis increases with increasing distance and lower reflectivity, i.e. with weaker signal amplitude and increased noise. The dotted lines show the measurement uncertainty and thus also the actual possible maximum and minimum switching distances Son and Soff. Here, the hysteresis H was selected such that the distance of the measurement uncertainty intervals (forbidden area) is always equal, the invention, however, should not be limited thereto. However, the measurement uncertainty intervals should not overlap at all. In order to create al-ways the same physical switching point for slow moving objects with different reflectivity, the switching thresholds have to be adapted to the respective upper limit of the measurement uncertainty interval which is designated here by Smax. For safety-relevant applications it may also be necessary to use Smin.

Finally it should be noted that the teaching of the invention can also be applied in foreground suppression, for multiple switching points or even in contrast reversal (dark switching) in a corresponding adapted form.

Hereinafter, the method according to the invention is explained in more detail. The optical proximity switch monitors an area which extends from the proximity switch S to the switching distance SAE 60%. Once an object enters this area the switch should react. Thus, if an object distance E1 is detected, which is less than the switching distance SAE, the switch output is activated and the switch goes in the on state. The proximity switch is often provided with a switching state LED which signals when an object has been detected in the monitored area. This information is also forwarded to a controller that evaluates or processes the switching signal. The controller may be a PLC or a monitoring unit. The switching distance SAE can be adjusted between 10-100% of the nominal switching distance which allows the user to adapt it to its specific monitoring situation. Optical proximity switches often detect objects (e.g. black packagings) which pass on a production line perpendicular to the axis of the proximity switch. If the object leaves the monitored area the switch should switch back to the off state.

After switching on the proximity switch the hysteresis range is not yet defined. If an object distance is determined which is larger than the switching distance SAE 60, such as the background against which packagings pass, at first the reflectivity of the object is determined (white wall as a background). For this purpose, e.g. an array of curves stored in the proximity switch can be used which indicate the reflectivity of objects reflecting with different intensities as a function of the distance. With respect to the object (white background) due to the measured object distance the reflectivity R 90% can be specified. With this determined reflectivity R 90% the hysteresis range 0.8 matching with the selected switching distance 60 is determined from the array of curves shown in FIG. 2. If the measured object distance is greater than 60+0.8%·60=60.48 the switching output is deactivated, i.e., the proximity switch switches into the off state.

A significant advantage offered by the invention is that for black objects which are to be detected against a white background, despite the relative high measurement uncertainty for black objects a narrow hysteresis range can be selected, since a black object which passes relative close to the switching distance, indeed can switch on the switch but cannot switch off the switch again. If after switching on for the same black object an object distance greater than SAE is determined, its reflectivity is determined which is 6%, resulting in a relatively large hysteresis range, whose end may be disposed even behind the white wall as a background.

LIST OF REFERENCE NUMBERS

1 Transmitter
2 Oscillator
3 PMD receiver
4 Object, measurement object
5 Control and evaluation unit
6 Binary switching output
7 Analog output
8 Phase signal, phase shift between transmission and reception signals
9 Reception amplitude
qa Charge in channel a
qb Charge in channel b
H Hysteresis
E Object distance
SAE Switching distance
R Reflectivity=reflectivity of the object

The invention claimed is:

1. Method for operating an optical proximity switch comprising a light transmitter (1), a light receiver (3) and an evaluation unit (5) with a binary switching out-put (6), which indicates whether an object (4) is disposed within a predetermined area, wherein an object distance E is determined by measuring by means of a time-of-flight method, wherein the predetermined area is limited by an adjustable switching distance SAE, wherein the switching output (6) is activated when the measured object distance E1 is smaller than the switching distance SAE wherein the switching output (6) is deactivated again when the measured object distance E2 is detected as bigger than the sum of switching distance SAE and a hysteresis H; characterized in that in the optical proximity switch a table with values of a hysteresis H(SAE,R) is stored, or an algorithm is stored, wherein the values of the hysteresis H(SAE,R) are calculated by a microprocessor according to said algorithm, wherein the values of the hysteresis H(SAE,R) are depending on the switching distance SAE and a reflectivity R of the object (4), wherein after activation of the switching output (6) in addition to the object distance E also the reflectivity R is determined and the switching output (6) is only deactivated if the measured object distance is bigger than the sum of switching distance SAE and the stored or calculated value of the hysteresis H(SAE,R) is satisfied.

2. Method according to claim 1, characterized in that the reflectivity R of the object (4) is detected and is stored as a detected reflectivity R1 when the switching output (6) is activated, after the activation of the switching output (6) the actual reflectivity R2 is measured and a value of the hysteresis H(SAE,R1,R2) is determined depending on said reflectivity R2 measured after activation.

3. Method according to claim 1, characterized in that the reflectivity R of the object (4) is entered manually or via a data interface.

4. Method according to claim 1, characterized in that the reflectivity R of the object (4) is stored in the evaluation unit in the form of a table of characteristic values.

5. Method according to claim 1, characterized in that a signal amplitude is measured and the reflectivity R is calculated as a function of the switching distance SAE and the measured signal amplitude according to the algorithm stored in the proximity switch.

6. Optical proximity switch comprising a transmitter (1), a receiver (3) and an evaluation unit (5) including a binary switching output (6)) for indicating whether an object (4) is located in a predefined area, wherein the distance of the object (4) is determined in accordance with a time-of-flight method and a hysteresis H determines the difference between a switching distance SAE, which is a switch-on point at which the switching output (6) is activated and the sum of switching distance SAE and a hysteresis H, which is a switch-off point at which the switching output (6) is deactivated again; characterized in that a table with values of a hysteresis H(SAE,R) or an algorithm for calculating the values of a hysteresis H(SAE,R) is stored in the optical proximity switch, wherein the values of the hysteresis H(SAE,R) are depending on the switching distance SAE and a reflectivity R of the object (4) and wherein the hysteresis H is adjusted by means of these values of the hysteresis H(SAE,R).

* * * * *